US 11,816,555 B2
Nov. 14, 2023

(12) United States Patent
Rickard et al.

(54) SYSTEM AND METHOD FOR CHAINING DISCRETE MODELS

(71) Applicant: Palantir Technologies Inc., Denver, CO (US)

(72) Inventors: Jesse Rickard, Palo Alto, CA (US); Andrew Floren, New York, NY (US); Timothy Slatcher, Golden, CO (US); David Skiff, Iowa City, IA (US); Thomas McArdle, London (GB); David Fowler, New York, NY (US); Aravind Baratha Raj, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 17/171,898

(22) Filed: Feb. 9, 2021

(65) Prior Publication Data

US 2021/0248447 A1 Aug. 12, 2021

Related U.S. Application Data

(60) Provisional application No. 62/975,610, filed on Feb. 12, 2020.

(51) Int. Cl.
*G06N 3/045* (2023.01)
*G06N 3/084* (2023.01)
*G06N 5/04* (2023.01)

(52) U.S. Cl.
CPC ............. *G06N 3/045* (2023.01); *G06N 3/084* (2013.01); *G06N 5/04* (2013.01)

(58) Field of Classification Search
CPC ........ G06N 20/00; G06N 3/0454; G06N 3/08; G06N 3/0445; G06N 3/084; G06N 20/20; G06N 3/04; G06N 5/04
See application file for complete search history.

(56) References Cited

U.S. PATENT DOCUMENTS 9,275,482 B1 3/2016 Dannelongue
10,113,408 B2 10/2018 Pobedinski et al.
(Continued)

FOREIGN PATENT DOCUMENTS

EP 3107014 12/2016
EP 3866024 8/2021
(Continued)

OTHER PUBLICATIONS

Ba et al., "Blending Diverse Physical Priors with Neural Networks," Oct. 1, 2019, arXiv:1910.00201v1 [cs.LG], pp. 1-15 (Year: 2019).*
(Continued)

*Primary Examiner* — Ying Yu Chen
*Assistant Examiner* — Sidney Vincent Bostwick
(74) *Attorney, Agent, or Firm* — Knobbe, Martens, Olson & Bear, LLP

(57) ABSTRACT

Systems, computer program products, and computer-implemented methods for determining relationships between one or more outputs of a first model and one or more inputs of a second model that collectively represent a real world system, and chaining the models together. For example, the system described herein may determine how to chain a plurality of models by training an artificial intelligence system using the nodes of the models such that the trained artificial intelligence system predicts related output and input node connections. The system may then link related nodes to chain the models together. The systems, computer program products, and computer-implemented methods may thus, according to various embodiments, enable a plurality of discrete models to be optimally chained.

18 Claims, 10 Drawing Sheets

(56) References Cited

U.S. PATENT DOCUMENTS

| | | | |
|---|---|---|---|
| 11,567,639 | B2 | 1/2023 | Rickard et al. |
| 11,650,728 | B2 | 5/2023 | Floren et al. |
| 2004/0107085 | A1 | 6/2004 | Moosburger et al. |
| 2005/0010901 | A1 | 1/2005 | Udler |
| 2010/0050152 | A1 | 2/2010 | Gilboa |
| 2015/0348310 | A1 | 12/2015 | Watanabe et al. |
| 2016/0097270 | A1 | 4/2016 | Pobedinski et al. |
| 2016/0110369 | A1 | 4/2016 | Cervelli et al. |
| 2016/0180466 | A1 | 6/2016 | Caldwell |
| 2016/0210270 | A1 | 7/2016 | Kelly et al. |
| 2018/0024731 | A1 | 1/2018 | Sanches et al. |
| 2018/0181093 | A1 | 6/2018 | Schulz et al. |
| 2018/0337940 | A1 | 11/2018 | Seiver |
| 2020/0124753 | A1 | 4/2020 | Halsey et al. |
| 2020/0162340 | A1 | 5/2020 | Rossi et al. |
| 2020/0311199 | A1* | 10/2020 | Yan .................. G06F 16/367 |
| 2021/0119576 | A1* | 4/2021 | Padullaparthi ......... G06F 30/27 |
| 2021/0255748 | A1 | 8/2021 | Rickard et al. |
| 2022/0075515 | A1 | 3/2022 | Floren et al. |
| 2022/0236965 | A1 | 7/2022 | Rahill-Marier et al. |
| 2023/0125026 | A1 | 4/2023 | Rickard et al. |

FOREIGN PATENT DOCUMENTS

| | | |
|---|---|---|
| EP | 3869414 | 8/2021 |
| WO | WO 2022/056529 | 3/2022 |
| WO | WO 2022/159890 | 7/2022 |

OTHER PUBLICATIONS

Liu et al., "DARTS: Differentiable Architecture Search," Apr. 23, 2019, arXiv:1806.09055v2 [cs.LG], pp. 1-13 (Year: 2019).*

Cai et al. ("ProxylessNAS: Direct Neural Architecture Search on Target Task and Hardware," Feb. 23, 2019, arXiv:1812.00332v2 [cs.LG], pp. 1-13 (Year: 2019).*

Gregor et al., "Learning Fast Approximations of Sparse Coding," 2010, Proceedings of the 27th International Conference on Machine Learning, 8 pages (Year: 2010).*

Guo et al., "A recurrent neural network based health indicator for remaining useful life prediction of bearings," 2017, Neurocomputing 240, pp. 98-109 (Year: 2017).*

Wu et al. ("FBNet: Hardware-Aware Efficient ConvNet Design via Differentiable Neural Architecture Search," Dec. 14, 2018, arXiv:1812.03443v2 [cs.CV], pp. 1-10 (Year: 2018).*

Das et al., "Chains of Reasoning over Entities, Relations, and Text using Recurrent Neural Networks," 2017, arXiv:1607.01426v3 [cs.CL], 10 pages (Year: 2017).*

Cai et al., "Link Prediction Approach for Opportunistic Networks Based on Recurrent Neural Network," 2019, IEEE Access, vol. 7, pp. 2017-2025 (Year: 2019).*

Chen et al., "Exploiting Structural and Temporal Evolution in Dynamic Link Prediction," 2018, CIKM'18, pp. 427-436 (Year: 2018).*

Lei et al., "GCN-GAN: A Non-linear Temporal Link Prediction Model for Weighted Dynamics Networks," 2019, arXiv:1901.09165 [cs.SI], 9 pages (Year: 2019).*

Reichstein et al., "Deep learning and process understanding for data-driven Earth system science," 2019, Nature 566, pp. 195-204 (Year: 2019).*

Wright, Alec, Eero-Pekka Damskägg, and Vesa Välimäki. "Real-time black-box modelling with recurrent neural networks." 22nd international conference on digital audio effects (DAFx-19). 2019. (Year: 2019).*

Kuhn, Christopher B., et al. "Introspective black box failure prediction for autonomous driving." 2020 IEEE Intelligent Vehicles Symposium (IV). IEEE, 2020. (Year: 2020).*

Rubiolo, Mariano, et al. "Knowledge discovery through ontology matching: An approach based on an Artificial Neural Network model." Information Sciences 194 (2012): 107-119. (Year: 2012).*

Ahmed et al., "BranchConnect: Image Categorization with Learned Branch Connections", Mar. 12, 2018, IEEE Winter Conference on Applications of Computer Vision, pp. 1244-1253.

Ahmed et al., "MaskConnect: Connectivity Learning by Gradient Descent", Jul. 28, 2018, pp. 1-25.

Zaamout et al., "Improving Neural Networks Classification Through Chaining", Sep. 11, 2012, Artificial Neural Networks and Machine Learning ICANN, 8 pages.

Official Communication for European Patent Application No. 21156704.5 dated Jul. 9, 2021, 7 pages.

Official Communication for European Patent Application No. 21156705.2 dated Jul. 23, 2021, 11 pages.

U.S. Appl. No. 17/171,927, Interactive Graphical User Interfaces for Simulated Systems, filed Feb. 9, 2021.

U.S. Appl. No. 17/447,105, Interactive Graphical User Interfaces for Simulated Systems, filed Sep. 8, 2021.

U.S. Appl. No. 17/583,058, Auto-Generating Interactive Workflow User Interfaces for Simulated Systems, filed Jan. 24, 2022.

Bellmann, "Interactive Simulations and advanced Visualization with Modelica," Proceedings of the 48th Scandinavian Conference on Simulation and Modeling (SIMS 2007), vol. 43, Oct. 8, 2009, pp. 541-550.

SCIL Systems & Control Innovation Lab, "The DLR Visualization Library," retrieved from the Internet: https://web.archive.org/web/20200813110336/https://www.systemcontrolinnovationlab.de/the-dlr-visualization/library/, Aug. 13, 2020, 3 pages.

International Search Report and Written Opinion for International Application No. PCT/US2021/071395 dated Dec. 14, 2021, 16 pages.

International Search Report and Written Opinion for International Application No. PCT/US2022/013705 dated Apr. 21, 14 pages.

Kali et al., "Sliding Mode with Time Delay Control for MIMO Nonlinear Systems With Unknown Dynamics," 2015, 6 pages.

International Search Report and Written Opinion for International Application No. PCT/US2022/013705 dated Apr. 21, 2022, 14 pages.

* cited by examiner

SYSTEM AND METHOD FOR CHAINING DISCRETE MODELS

CROSS-REFERENCE TO RELATED APPLICATIONS

This application claims a priority benefit under 35 U.S.C. § 119 to U.S. Provisional Patent Application No. 62/975,610, filed on Feb. 12, 2020, and titled "SYSTEM AND METHOD FOR CHAINING DISCRETE MODELS," the disclosure of which is hereby incorporated by reference herein in its entirety.

TECHNICAL FIELD

The present disclosure relates to models for simulating physical systems and interactive user interfaces for chaining discrete models.

BACKGROUND

A database may store a large quantity of measurement data. For example, a technical system may comprise a large number of sensors that each collect measurements at regular intervals, and the measurements may be stored in the database. The measurement data can be supplemented with other data, such as simulated information based on the sensor measurements, and the supplemental data can also be stored in the database. In some cases, a user may attempt to analyze a portion of the stored data. For example, the user may attempt to analyze the simulated information in order to optimize the sensor system. However, the simulated information, by itself, may not be sufficient to allow the user to optimize the sensor system.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems, computer program products, and computer-implemented methods for determining relationships between one or more outputs of a first model and one or more inputs of a second model that collectively represent a real world system, such as a technical real world system, and chaining the models together. Rather than pre-creating or pre-coding mappings based on definitions of outputs and inputs of the models, the system may determine how to chain two models by training an artificial intelligence system (e.g., an artificial intelligence model) using the nodes of the models such that the trained artificial intelligence system predicts related output and input node connections. The system may then link related nodes to chain the models together. The chaining of the models may allow to identify that some model parameters are superfluous, while others are redundantly covered by some sensors, and yet others are insufficiently covered. This insight may allow the user to optimize the sensor system.

The system may further optimize the chaining by unrolling the artificial intelligence system and linking new and existing related node connections based on the model learning performed by the artificial intelligence system. The system may also optimize the real world system simulation by monitoring the (technical) health of each model. The system may determine the health of a model by comparing the object properties of the model with related actual or inferred object properties. For example, the system may compare a virtual pump flow rate with an actual pump flow rate or may compare the maximum load observed on a virtual lever with an inferred maximum load capacity of an actual, physical lever. The system may use the difference between such comparisons to determine the health of a technical object property, where the system may determine that a smaller difference results in a healthier object property and therefore a healthier model. Thus, the health of a technical object property of a model indicates the health of the model. The system may create a model hierarchy by monitoring the health of models in relation to the related nodes of the respective models, where models identified as being related based on the related nodes are grouped together, and where the grouped related models are ordered by the health of each model within the group. The system may select the healthiest model in the model hierarchy and place this model in an existing chained model system. Thus, the system could, for instance, replace a related model with the healthiest model, compare a related model to the healthiest model, or chain the related model to the healthiest model.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays). The interactive user interface assists the user in monitoring and/or controlling the real world system by means of a continued and/or guided human-machine interaction process.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate (e.g., forecast) future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems. The manner of presentation assists the user in monitoring and/or controlling various technical components and processes by means of a continued and/or guided human-machine interaction process. In some of the embodiments, the monitoring and/or controlling is performed in real-time In some of the embodiments, the methods and systems described herein may receive input from one or more real-world systems and may also provide output to one or more real-world systems. In some of these embodiments, (measured) parameter values are obtained from measuring devices or sensors in a (technical) real-world system, the parameter values may be used, for example, to train one or more models (e.g. based on machine learning) or a basic model is already provided and the parameter values are used to adapt to the real-world system and/or to further refine the model. The or more models may be chained by linking output of one model with input of another model and the chained models then allow to simulate the (technical) realword system and the insights/predictions obtained via the simulation may be used for monitoring and/or controlling the real-world system, e.g. using actuators, via the interactive and dynamic graphical user interfaces that are described herein. Such an approach may be employed, for example, to monitor and/or control a water treatment physical system or any other real-world system as will be explained in more detail below.

Various embodiments of the present disclosure provide improvements to various technologies and technological fields. For example, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

One aspect of the disclosure provides a computer-implemented method for model chaining. The computer-implemented method comprises: by one or more processors executing program instructions: obtaining a plurality of models, where the plurality of models comprises a first model and a second model, and where each of the first and second models comprises at least one or more objects having one or more object properties; simulating the first and second models to obtain a parameter output node of the first model and a parameter input node of the second model; training an artificial intelligence model using the parameter output and input nodes, where the artificial intelligence model, when executed, predicts that the parameter output node is related to the parameter input node; and chaining the first and second models by linking the parameter output node with the parameter input node, where the method is performed using one or more processors.

The computer-implemented method of the preceding paragraph can include any sub-combination of the following features: where the computer-implemented method further comprises optimizing the chained first and second models by recurrently linking related parameter output nodes with related parameter input nodes; where the computer-implemented method further comprises optimizing the chained first and second models by iteratively optimizing a converging series of the chained first and second models; where optionally the converging series of the chained first and second models converges towards an optima, where a gradient on the series of the chained first and second models converges towards the optima; where the artificial intelligence model is a recurrent neural network; where optionally training an artificial intelligence model further comprises unrolling the recurrent neural network; where optionally training an artificial intelligence model further comprises applying a backpropagation to the unrolled recurrent neural network to calculate and accumulate one or more gradients; where the first model is one of a known or black box system; where the at least one or more objects are one of physical or virtual devices; where optionally the at least one or more objects at least one of detect, measure, position, signal, gauge, or sense external stimuli; where optionally the at least one or more objects are at least one of user configurable, editable, or removable; where the one or more object properties are at least one of numerical, physical, geometrical, inferred, real, simulated, or virtual; where the first and second models are simulated for a time range or a point in time; where the computer-implemented method further comprises causing display of the chained first and second models in a graphical user interface that depicts at least one of interconnections between the first and second models, the parameter input node, the parameter output node, the at least one or more objects, or the one or more object properties; where a first object property of the one or more object properties is associated with the first model and has a health value; where the health value of the first object property of the model indicates a health of the first model; where the computer-implemented method further comprises generating a model hierarchy based on the health of the first model and a health of the second model; and where the computer-implemented method further comprises grouping a third model in the plurality of models and a fourth model in the plurality of models that share related parameter nodes.

Another aspect of the disclosure provides a system for model chaining comprising one or more non-transitory computer readable storage mediums storing program instructions. The system further comprises one or more processors configured to execute the program instructions, where the program instructions, when executed, cause the system to: obtain a plurality of models, where the plurality of models comprises a first model and a second model, and where each of the first and second models comprises at least one or more objects having one or more object properties; simulate the first and second models to obtain a parameter output node of the first model and a parameter input node of the second model; train an artificial intelligence model using the parameter output and input nodes, where the artificial intelligence model, when executed, predicts that the parameter output node is related to the parameter input node; and chain the first and second models by linking the parameter output node with the parameter input node.

Another aspect of the disclosure provides non-transitory, computer-readable storage media comprising computer-executable instructions for chaining models using artificial intelligence, where the computer-executable instructions, when executed by a computer system, cause the computer system to: obtain a plurality of models, where the plurality of models comprises a first model and a second model, and where each of the first and second models comprises at least one or more objects having one or more object properties; simulate the first and second models to obtain a parameter output node of the first model and a parameter input node of the second model; train an artificial intelligence model using the parameter output and input nodes, where the artificial intelligence model, when executed, predicts that the parameter output node is related to the parameter input node; and chain the first and second models by linking the parameter output node with the parameter input node.

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1:
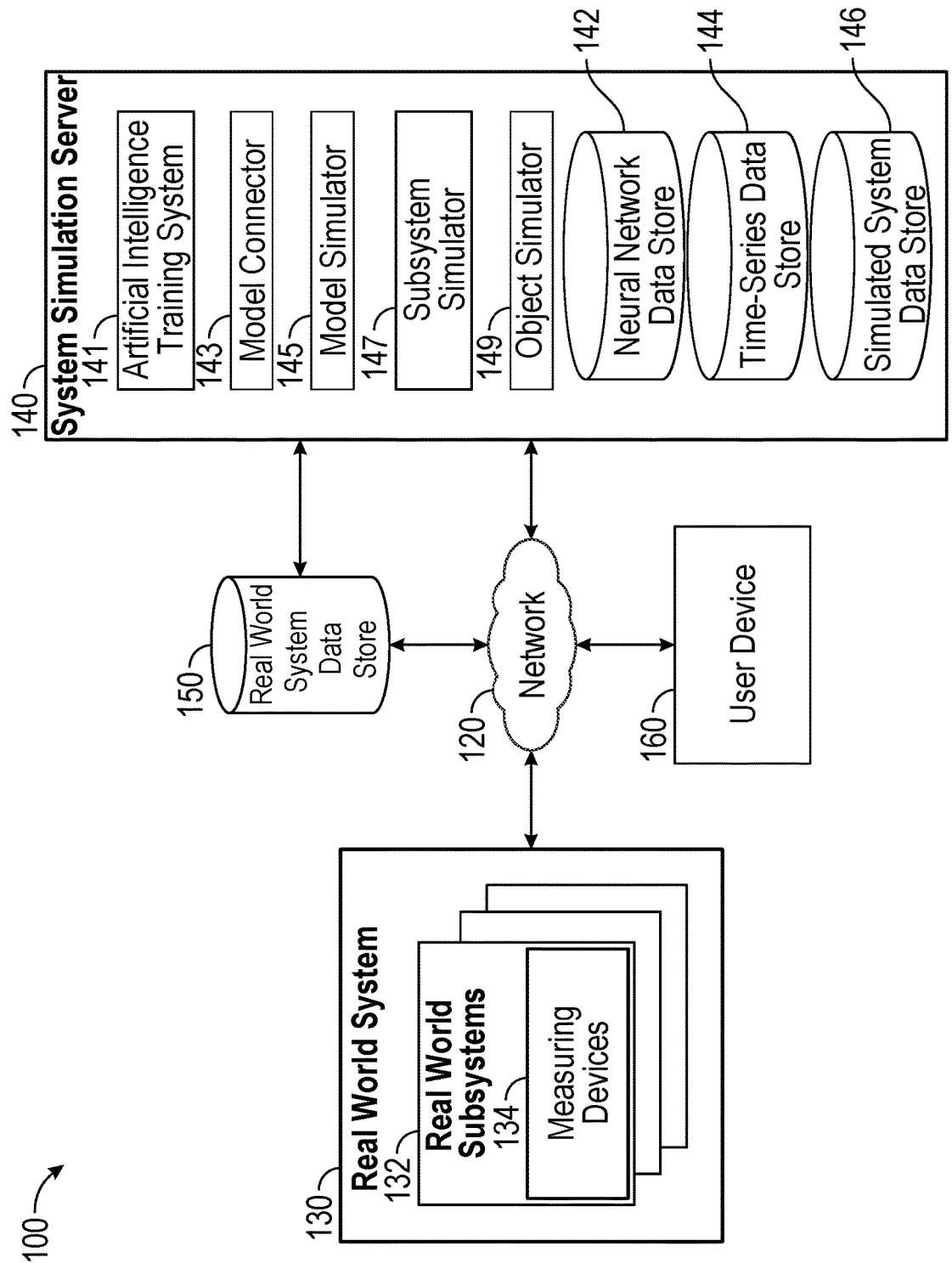
FIG. 1 is a block diagram illustrating a system for determining and chaining relationships between models that collectively represent a real world system.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION

In the following, numerous specific details are set forth to provide a thorough description of various embodiments.

Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Measuring Device or Sensor: A device, system, or collection of devices or systems that can provide information associated with an entity (e.g., device, system, gauge, instrument, detector, antenna, monitor, or any kind of scope, meter, or graph). For example, a sensor may provide reporting values (e.g., measurements or other information) associated with a manufacturing instrument. The received values may comprise values related to physical attributes or measurements (e.g., temperature, pressure, size, etc.), values related to virtual activity or measurements (e.g., network traffic, IP addresses, etc.), and/or the like. The information provided by sensors may be utilized and analyzed for various purposes.

Model: A representation of one or more entities (e.g., systems, subsystems, objects) and the relationships between the one or more entities. The entities and/or the relationships which represent the model may not be disclosed and thus a model may be "unknown" or "black box", whereas if the entities and/or relationships which represent the model may be disclosed then the model may be "known".

Node: Contains data (e.g., parameters) and may link to other nodes. A node may represent information contained in a data structure.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types.

Parameter: A measurable factor or characteristic that may define or classify a system (e.g., a model).

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g., a time series), etc.

Property Value: The value associated with a property, which is of the type indicated in the property type associated with the property. A property may have multiple values.

Subsystem: A self-contained system within a larger system.

System: A set or group of interacting or interrelated entities (e.g., subsystems, objects) that form a unified whole or an interconnecting network.

Introduction

Multiple data models may be used to accurately simulate a real world system, such as a technical real world system. Coupling these data models to simulate the real world system, however, is challenging because these data models may be constructed by different teams or organizations, use different objects and object properties, and contain known or black box (e.g., unknown) components. Therefore, though a user may have multiple data models to work with and analyze, coupling the data models together to construct the desired real world system can be difficult. Further, modifying the data models to, for example, combine the components of the individual data models in a structured way to form a single data model may not be reasonable depending on the scale of each individual data model and number of components included therein. Moreover, some models or components may be black boxes, so a user may not be able to modify a particular data model at all. For example, the data model may take an input and produce an output, but the algorithms, functions, properties, values, etc. that are used to produce the output given the input may be unknown and inaccessible to the user.

It may be beneficial to be able to simulate a technical real world system by coupling the various data models that collectively represent the technical real world system so that the impact a broken object in a particular data model has on another data model may be determined, whether implementing a new data model with one or more existing data models would still result in compliance with various conditions or requirements, the shelf life of an object in a particular data model when the particular data model is coupled to another data model may be determined, etc. A system that can couple or unify multiple data models together, even if the data models include unknown components, can achieve the technical benefits described above and be used to design more accurate real world systems.

To overcome the technical deficiencies outlined above, disclosed herein is a system, computer program product, and computer-implemented method for determining relationships between one or more outputs of a first model and one or more inputs of a second model that collectively represent a real world system (e.g., an actual system present in the real world, such as a physical system, a technical system, a logical system (e.g., a supply chain of products, services, and/or customers), etc.), and chaining the models together. In some embodiments, rather than pre-creating or pre-coding mappings based on definitions of outputs and inputs of the models, the system may determine how to chain two models by training an artificial intelligence system (e.g., an artificial intelligence model, such as a recurrent neural network) using the nodes of the models such that the trained artificial intelligence system predicts related output and input node connections. The system may then link related nodes to chain the models together.

The system may further optimize the chaining by unrolling the artificial intelligence system (e.g., the recurrent neural network) and linking new and existing related node connections based on the model learning performed by the artificial intelligence system. The system may also optimize the real world system simulation by monitoring the (technical) health of each model. The system may determine the health of a model by comparing the object properties of the model with related actual or inferred object properties. For example, the system may compare a virtual pump flow rate with an actual pump flow rate or may compare the maximum load observed on a virtual lever with an inferred maximum load capacity of an actual, physical lever. The system may use the difference between such comparisons to determine the health of a technical object property, where the system may determine that a smaller difference results in a healthier object property and therefore a healthier model. Thus, the health of an object property of a model indicates the health of the model. The system may create a model hierarchy by monitoring the health of models in relation to the related nodes of the respective models, where models identified as being related based on the related nodes are grouped together, and where the grouped related models are ordered by the health of each model within the group. The system may select the healthiest model in the model hierarchy and place this model in an existing chained model system. Thus, the system could, for instance, replace a related model with the healthiest model, compare a related model to the healthiest model, or chain the related model to the healthiest model. The chaining of the models may also allow to identify that some model parameters are superfluous, while others are redundantly covered by some sensors, and yet others are insufficiently covered. This insight may allow the user to optimize the sensor system.

Exemplary System Overview

FIG. 1 illustrates a block diagram showing the various components of a system 100 for determining and chaining relationships between models that collectively represent a technical real world system. As illustrated in FIG. 1, the system 100 may include a real world system 130, a system simulation server 140, a real world system data store 150, and a user device 160. In an embodiment, the real world system 130, the system simulation server 140, the real world system data store 150, and the user device 160 communicate via a network 120. In other embodiments, there may be multiple real world systems 130. These multiple real world systems 130 may be of the same and/or different types. Further the multiple real world systems 130 may also communicate via the network 120. Similarly, the functionality disclosed with reference to these components may be distributed to other computing devices and/or partially performed by multiple computing devices.

The real world system 130 may be a logical system, such as a representation of a supply chain of products, services, and/or customers. The real world system 130 may be a structure that comprises various components and equipment and may be located in various areas. For example, the real world system 130 may be located at an environmental monitoring and/or research site such as a volcano, an ocean, a river, a lake, an ice sheet, a forest, and/or the like. In another example, the technical real world system 130 may be a manufacturing site, such as a location in which machinery is used to make articles. In another example, the technical real world system 130 may be a vehicle such as a car, a bus, an airplane, a train, a boat, a bicycle, and/or the like. In another example, the technical real world system 130 may be a mine, water production or treatment system, a water pipeline, an irrigation system, and/or the like.

The technical real world system 130 may further include a plurality of technical real world subsystems 132. The technical real world subsystems 132 may make up the technical real world system 130. For example, the technical real world subsystems 132 may be a logical subsystem (e.g., a supply chain subsystem, such as a group of activities performed at a particular location like a distribution center). As another example, the technical real world subsystems 132 may be a pumping subsystem, a separation subsystem, and a compression subsystem that make up a water treatment physical system. As another example, the technical real world subsystems 132 may be a movement detection subsystem, a gas detection subsystem, and/or other related subsystems that form a volcano monitoring physical system.

A plurality of logical computations (e.g., order volume, sales quantity during a time period, etc.), sensors, and/or measuring devices 134 may couple to the real world subsystems 132. Sensors and/or measuring device 134 allow to incorporate parameter input values from which models are obtained. The models can then be simulated to obtain parameter output values that may be used to monitor and/or control a real world system, using e.g. actuators. For example, the real world subsystem 132 may include one or more logical computations if the real world subsystem 132 is a logical subsystem. The logical computations 134 may detect or measure statistics or other numerical values associated with the object (e.g., an item, a product, etc.) passing through the logical subsystem. As another example, the technical real world subsystem 132 may include one or more sensors and/or measuring devices if the technical real world subsystem 132 is a physical subsystem. As an illustrative example, a compression subsystem may include a sensor and/or measuring device coupled to a compressor and a sensor and/or measuring device coupled to a compressor valve. As another illustrative example, a movement detection system may include a seismograph, a motion detector, a camera, and/or the like. The sensors and/or measuring devices 134 may detect or measure physical properties, such as pressure, flow rate, acoustic signals, temperature or changes in temperature, vehicle speed, motion, images, and/or the like.

In some embodiments, the technical real world subsystems 132 may not exist and only a real world system 130 includes the plurality of logical computations, sensors, and/or measuring devices 134. For example, a supply chain system may include one or more logical computations associated with the supply chain itself. As another example, a water pipeline physical system may include a sensor and/or measuring device coupled to the water pipeline. Another example may include a manufacturing site physical system that may include sensors and/or measuring devices coupled to a machinery physical subsystem so that monitoring of the operation of machinery at the manufacturing site and variations in manufacturing conditions, such as temperature, efficiency, output, etc., and/or the like may occur. Another example may include an airplane physical system that may include sensors and/or measuring devices coupled to one or more airplane physical subsystems, such as the engine, the transmission, the flaps, the propeller, the wheels, the landing gear, the exhaust, the rudder, etc., to track operation of the airplane physical subsystems, monitor weather conditions, identify deviations from an expected travel route, track fuel efficiency, and/or the like. The examples described herein are not meant to be limiting.

The technical real world system 130 may further include logical computations, sensors, and/or measuring devices 134 coupled to real world subsystems 132 that directly transmit the measurement data over the network 120 to the system simulation server 140. In another embodiment, the technical real world system 130 may include logical computations, sensors, and/or measuring devices 134 coupled to real world subsystems 132 that transmit the measurement data over the network 120 to the real world system data store 150. In another embodiment, the technical real world system 130 may include logical computations, sensors, and/or measuring devices 134 coupled to technical real world subsystems 132 that transmit the measurement data over the network 120 to the user device 160.

The system simulation server 140 may include various data stores and executable code modules. In an embodiment, the system simulation server 140 may include an artificial intelligence training system 141, a model connector 143, a model simulator 145, a subsystem simulator 147, an object simulator 149, a neural network data store 142, a time-series data store 144, and a simulated system data store 146. In an embodiment, the artificial intelligence training system 141, the model connector 143, the model simulator 145, the subsystem simulator 147, and the object simulator 149 are each implemented as executable code modules that are stored in the memory of, and executed by one or more processors of, the system simulation server 140. The artificial intelligence training system 141, the model connector 143, the model simulator 145, the subsystem simulator 147, and the object simulator 149 may also be implemented partly or wholly in application-specific hardware.

In some embodiments, the executable code modules of the system simulation server 140 may call an application programming interface (API) to perform various functions. The executable code modules may receive data via the network 120 and/or from the real world system data store 150, neural network data store 142, time-series data store 144, and/or simulated system data store 146. One or more of the data stores may be databases. Each of the real world system data store 150, neural network data store 142, time-series data store 144, and/or simulated system data store 146 may store data items of various types, as described herein.

The real world system data store 150 may store and provide to the network 120, and/or to the system simulation server 140, various data items that may be related to logical computations, measuring devices, physical subsystems, logical subsystems, physical systems, and logical systems. For example, such data items may include a statistic related to a technical product or item that is the subject of a supply chain, a measurement of a measuring device, a category of a physical or logical subsystem, a health of a physical or logical system, and/or other like data items.

The neural network data store 142 may store and provide to the network 120, real world system data store 150, and/or to the other various data stores and executable code modules within the system simulation server 140, various data items that may be related to technical objects, subsystems, models, parameter output nodes, and parameter input nodes that may be associated with an artificial neural network. For example, such data items may include a learned pattern of a technical object, an identification of a technical subsystem, a decision tree for a relationship chaining of a model, a relationship prediction of a parameter output node, a relationship prediction of a parameter input node, neural network model parameters, and/or other like data items.

The time-series data store 144 may store and provide to the network 120, real world system data store 150, and/or to the other various data stores and executable code modules within the system simulation server 140, various data items related to objects, subsystems, and/or models measured or generated over a period of time and/or at a specific point in time. For example, such data items may include a shelf life of a technical object, a schedule of a technical subsystem, historical information of a model, and/or other like data items.

The simulated system data store 146 may store and provide to the network 120, real world system data store 150, and/or to the other various data stores and/or executable code modules within the system simulation server 140, various data items related to technical objects, subsystems, and/or models generated as a result of a simulation of the technical objects, subsystems, and/or models. For example, such data items may include a virtual copy of a physical object and related properties, a virtual subsystem simulated from a physical or logical subsystem, a model characterized by a physical or logical system, and/or other like data items.

While the neural network data store 142, time-series data store 144, and simulated system data store 146 are illustrated as being stored in the system simulation server 140, this is not meant to be limiting. The neural network data store 142, time-series data store 144, and/or simulated system data store 146 may be external to the system simulation server 140 and may communicate via network 120.

The artificial intelligence training system 141 may execute one or more artificial intelligence algorithms to perform analysis on data items, such as parameter output nodes, parameter input nodes, and models. In some embodiments, the artificial intelligence training system 141 may execute artificial intelligence algorithms that may use machine learning such that the artificial intelligence training system 141 may iteratively learn from the data items (e.g., parameter output nodes, parameter input nodes, black box models (e.g., models in which the algorithm(s) function(s), propert(ies), value(s), etc. that are used to produce an output given an input may be unknown or inaccessible) and/or known models (e.g., models in which the algorithm(s) function(s), propert(ies), value(s), etc. that are used to produce an output given an input may be known, obtained, derived, or are otherwise accessible)) without being explicitly programmed. Thus, the system simulation server 140 may be configured to use machine learning techniques to perform an action and may learn how to perform the action without being explicitly programmed. Accordingly, the machine learning techniques may improve the functionality of the system simulation server 140 itself as the machine learning techniques allow the system simulation server 140 to learn, and thereby produce more accurate predictions of parameter output and input node linked relationships. This may further enable more accurate chaining of models, as the models may be chained by the links established from the parameter output and input node relationships, without being explicitly programmed.

In some embodiments, the artificial intelligence training system 141 may execute and/or train a recurrent neural network (RNN). The RNN may be a type of artificial neural network where connections are formed between nodes (e.g., parameter input nodes and parameter output nodes), constructing a digraph (e.g., a graph that is made up of a set of vertices connected by edges) in which the edges of the digraph may have an associated direction, along a time series. The RNN may chain a plurality of black box and/or known models by recurrently linking related parameter input nodes and parameter output nodes. Accordingly, the RNN may improve the functionality of the system simulation server 140 itself as the RNN may allow the system simulation server 140 to optimize the chaining of the plurality of black box and/or known models, and thereby produce more accurate model relationships, classifications, rankings, and health evaluations.

The model simulator 145 may simulate one or more technical real world systems 130, and/or other like physical structures to obtain and/or generate one or more models. In some embodiments, the one or more models may be known (e.g., the relationships, subsystems and/or objects that make up the model based on the real world systems 130 and/or other like physical structures that the one or more models may simulate are known). In some embodiments, the one or more models may be black box or unknown (e.g., the relationships, subsystems and/or objects that make up the one or more models based on the real world systems 130 and/or other like physical structures that the models may simulate may not be all known such that at least one parameter of the black box models is unknown). In some embodiments, the model simulator 145 may be one or more third party physics and/or simulation engines that may simulate one or more known and/or black box models.

The model connector 143 may connect two or more models together via chaining, where the chaining occurs by linking predicted nodal relationships of parameter output nodes of one model with parameter input nodes of another model. In an embodiment, a link between a parameter output node of one model and parameter input node of another model may be established by the model connector 143 based on similar or matching parameter output nodes and parameter input nodes (e.g., the parameter output node of one model matches the parameter input node of another model), where the nodes may include model specific data comprised of subsystems, objects, and/or object properties (e.g., property types and/or property values). For example, the artificial intelligence training system 141 may use an RNN to accurately and recurrently classify the nodes by using the nodes as training examples. The nodes may then link and/or re-link based on which classified parameter input nodes and parameter output nodes are most similar. These are just some examples of the types of connections that may be represented by a link and other types of connections may be represented; embodiments are not limited to any particular types of connections between nodes. Each node may have multiple links with another node to form a link set. For example, two "Person" objects representing a husband and a wife could be linked through a "Spouse Of" relationship, a matching "Address" object property, and one or more matching "Event" object properties (e.g., a wedding).

The subsystem simulator 147 may simulate one or more technical real world subsystems 132 and/or other like subsystem structures of the real world system 130. In some embodiments, the subsystem simulator 147 may extract technical subsystem data (e.g., data of the physical subsystems, present in the real world system data store 150) to perform the simulation. For example, in the case of a water treatment physical system, the subsystem data may include parameters or measured data values originating from a water sedimentation subsystem, a water filtration subsystem, a water disinfection subsystem, and/or the like.

The object simulator 149 may simulate one or more objects (e.g., measuring devices, components etc.), of the technical real world subsystem 132 and/or real world system 130. In some embodiments, the object simulator 149 may extract object data (e.g., measuring device data, logical computation data (e.g., statistical values), etc.) present in the real world system data store 150 to perform the simulation. The data may include unusual or periodic (e.g., some component oscillating) technical object properties or events that may have occurred (e.g., historical object properties) during operation of the technical real world system 130, real world subsystem 132, or any other structure in which the logical computations, sensors, and/or measuring devices 134 are present. For example, in the case of a supply chain, the technical object properties may include a time that an item or product was shipped from one location to another location, a time that an item or product arrived at a particular location, etc. As another example, in the case of a water treatment system, the technical object properties may include particles settling to a bottom of a water storage tank during the water sedimentation process, a structural vibration in a component or a piece of equipment of the water treatment system, a failure of a component or a piece of equipment of the water treatment system, and/or the like.

In some embodiments, the real world system data store 150 may include error detection data which may indicate a physical subsystem and/or physical sensor error (e.g., malfunction, miscalibration, etc.) in one or more real world systems 130. The real world systems 130 may be known and/or black box.

The model simulator 145 may obtain, generate, and/or simulate one or more models based on the one or more real world systems 130 and/or the error detection data stored in the real world system data store 150. The one or more models may be stored in the simulated system data store 146. The error detection data from the physical data store 150 may include when the technical real world subsystem 132 and/or physical sensor error may have occurred at various times (e.g., historical sensor error data), and may store this time specific data in the time-series data store 144. The system simulation server 140 may further include an artificial intelligence training system 141 (e.g., a neural network, such as an RNN). The artificial intelligence training system 141 may use the error detection data as training examples. The artificial intelligence training system 141 may establish a set of learned relationship data that mathematically describes the physical relationships between the inputs and outputs of one or more logical computations, physical sensors, and/or measuring devices 134 and/or one or more technical real world subsystems 132 that comprise the one or more technical real world systems 130. The learned relationship data may be stored in the neural network data store 142. The model simulator 145 may transmit the various models and/or data from the time-series data store 144, neural network data store 142, and/or the simulated system data store 146 to the object simulator 149 to generate objects (e.g., virtual logical computations, virtual sensors, virtual measuring devices, etc.), and/or to the subsystem simulator 147 to generate subsystems (e.g., virtual subsystems that may further include the set of virtual logical computations, virtual sensors, virtual measuring devices, etc.). If no real world subsystem, logical computations, and/or physical sensor error has occurred, the one or more models relationships, subsystems and/or objects may closely mirror the actual real world subsystem, logical computations, and/or physical sensors. The model simulator 145 may compare actual real world subsystem, logical computations, and/or physical sensor data with simulated data of the one or more simulated models (e.g., data from the generated virtual logical computations, virtual sensors, virtual measuring devices, virtual subsystems etc.). If the difference between the two datasets is greater than a threshold value, then the model simulator 145 may determine that a virtual subsystem and/or virtual sensor error has occurred. The system simulation server 140 (e.g., the model simulator 145) may use the difference between the two datasets to determine the (technical) health of a subsystem (e.g., virtual subsystem), object (e.g., virtual sensor), and/or object property (e.g., measurement of the virtual sensor), where the system simulation server 140 (e.g., the model simulator 145) may determine that a smaller difference may result in a healthier subsystem, object, and/or object property, and therefore indicate a healthier model given that these components make up the model.

The system simulation server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the system simulation server 140 may be implemented in a Java Virtual Machine (JVM) that is executing in a distributed or non-distributed computer system. In other embodiments, the system simulation server 140 may be implemented as a combination of programming instructions written in any programming language (e.g., C++, Visual Basic, Python, etc.) and hardware components (e.g., memory, CPU time) that have been allocated for executing the program instructions.

A user may use the user device 160 to view and interact with the interactive user interface. For example, the user device 160 may be in communication with the system simulation server 140 via a network 120. The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the system simulation server 140.

In an embodiment, the network 120 includes any communications network, such as the Internet. The network 120 may be a wired network, a wireless network, or a combination of the two. For example, network 120 may be a local area network (LAN) and/or a wireless area network (WAN). The network 120 may include cables and/or other equipment that allow the transport of data from underwater locations to above-ground locations and/or vice-versa. For example, the network 120 may include one or more firewalls (e.g., a firewall that provides an interface between the real world system 130 and the other components of the network 120 and/or a firewall that provides an interface between the other components of the network 120 and the system simulation server 140 and/or the real world system data store 150) and/or an endpoint server, such as a secure HTTP endpoint system.

Exemplary Model Chaining Process Overview

Figure 2:
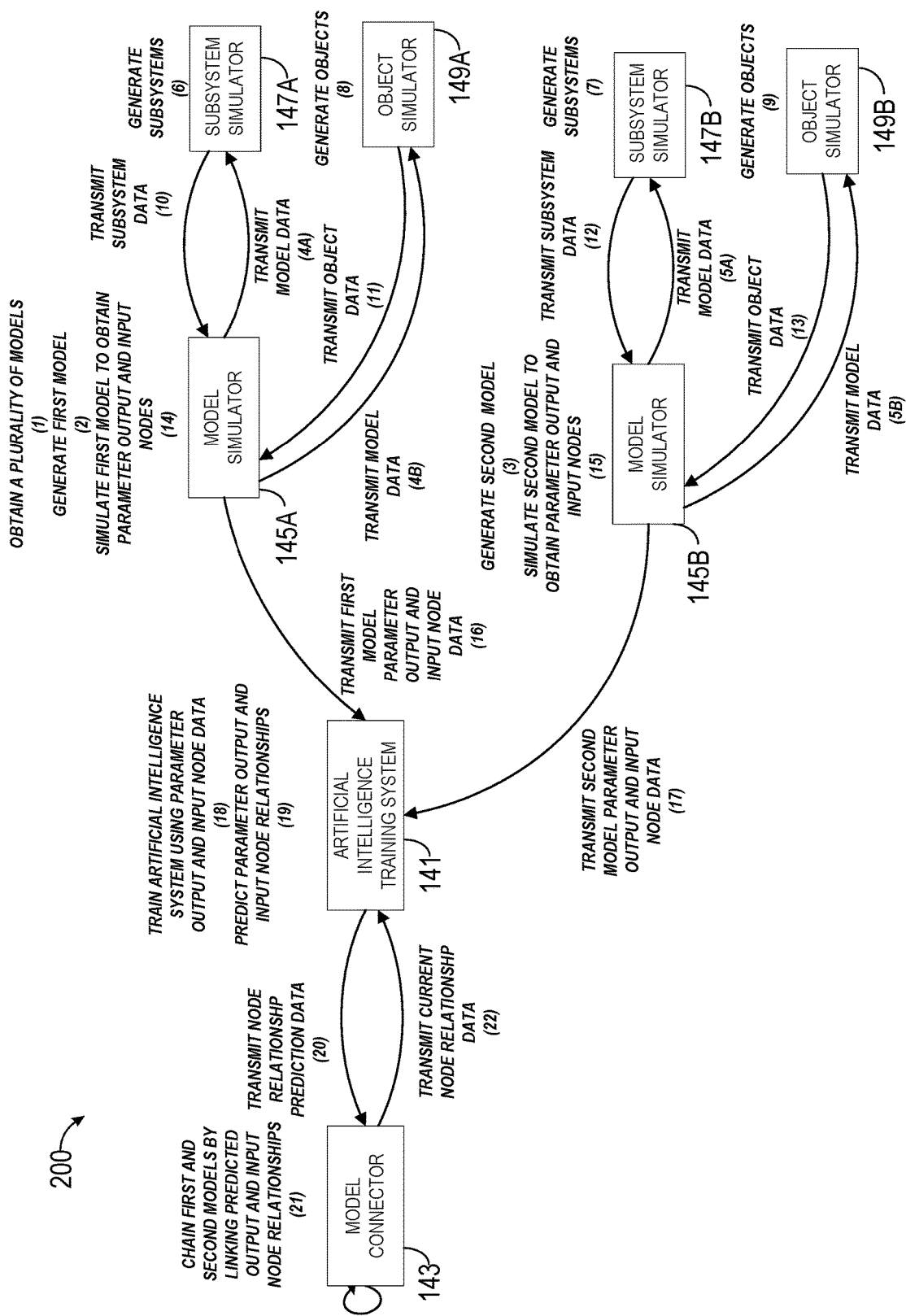
FIG. 2 is a state diagram illustrating the states for determining and chaining relationships between models that collectively represent a real world system.

FIG. 2 is an example state diagram 200 of the system which illustrates the states for determining relationships between one or more outputs of a first model and one or more inputs of a second model that collectively represent a technical real world system, and chaining the models together. Embodiments of this example are not limited to determining relationships and chaining only two models. For example, this example state diagram 200 may include determining relationships and chaining more than two models. Only two models are show in example state diagram 200 for exemplary purposes and ease of understanding.

The initial three operations are directed to obtaining and generating a plurality of models (e.g., obtaining and generating water treatment models). At (1), a plurality of models may be obtained by the model simulator 145A. At (2), the model simulator 145A may generate a first model from the plurality of models. The module simulator 145B may generate a second model from the plurality of models at (3).

The next operations involve generating model specific subsystems and objects in order to simulate the plurality of models (e.g., generating a water filtration subsystem and a virtual water level sensor object for the first water treatment model, and a water disinfection subsystem and a virtual pH level sensor object for the second water treatment model). The model simulator 145A may transmit model data (e.g., learned relationship data, error detection data etc.) from the first model to the subsystem simulator 147A at (4A) and to the object simulator 149A at (4B). The model simulator 145B may then transmit model data (e.g., learned relationship data, error detection data etc.) from the second model to the subsystem simulator 147B at (5A) and to the object simulator 149B at (5B).

At (6), the subsystem simulator 147A may generate technical subsystems (e.g., virtual subsystems) based on the data from the first model. At (7), the subsystem simulator 147B may generate subsystems (e.g., virtual subsystems) based on the data from the second model. At (8), the object simulator 149A may generate objects (e.g., virtual sensors, virtual measuring devices, etc.) based on the data from the first model. At (9), the object simulator 149B may generate objects (e.g., virtual sensors, virtual measuring devices, etc.) based on the data from the second model.

The subsystem simulator 147A may transmit the generated subsystem data based on the first model to the model simulator 145A at (10). At (11), the object simulator 149A may transmit the generated object data based on the first model to the model simulator 145A. Similarly, the subsystem simulator 147B may transmit the generated subsystem data based on the second model to the model simulator 145B at (12), and the object simulator 149B may transmit the generated object data based on the second model to the model simulator 145B at (13). In some embodiments, one or more models may not include subsystem specific data, and therefore operations (4A), (5A), (6), (7), (10), and/or (12) may be omitted. In some embodiments, one or more models may not include object specific data, and therefore operations (4B), (5B), (8), (9), (11), and/or (13) may be omitted.

Once the generated object data is transmitted, the model simulator 145 may simulate the plurality of models to obtain parameter output and input nodes based on the model specific generated subsystems and objects. For example, a parameter output node of the first water treatment model may be an output water level of the virtual water level sensor object, and a parameter input node of the second water treatment model may be an input water composition of the virtual pH level sensor object. Furthermore, the parameter output and input nodes may include error detection data, learned relationship data, etc. (e.g., the output water level of the virtual water level sensor object may include historical data parameters, max output water level parameters, minimum water level parameters, connection parameters etc. of the water level sensor object). At (14), the model simulator 145A simulates the first model to obtain parameter output and input nodes. At (15), the model simulator 145B simulates the second model to obtain parameter output and input nodes. The model simulator 145A can then transmit the first model parameter output and input nodes to the artificial intelligence training system 141 at (16), and the model simulator 145B can transmit the second model parameter output and input nodes to the artificial intelligence training system 141 at (17).

Figure 3:
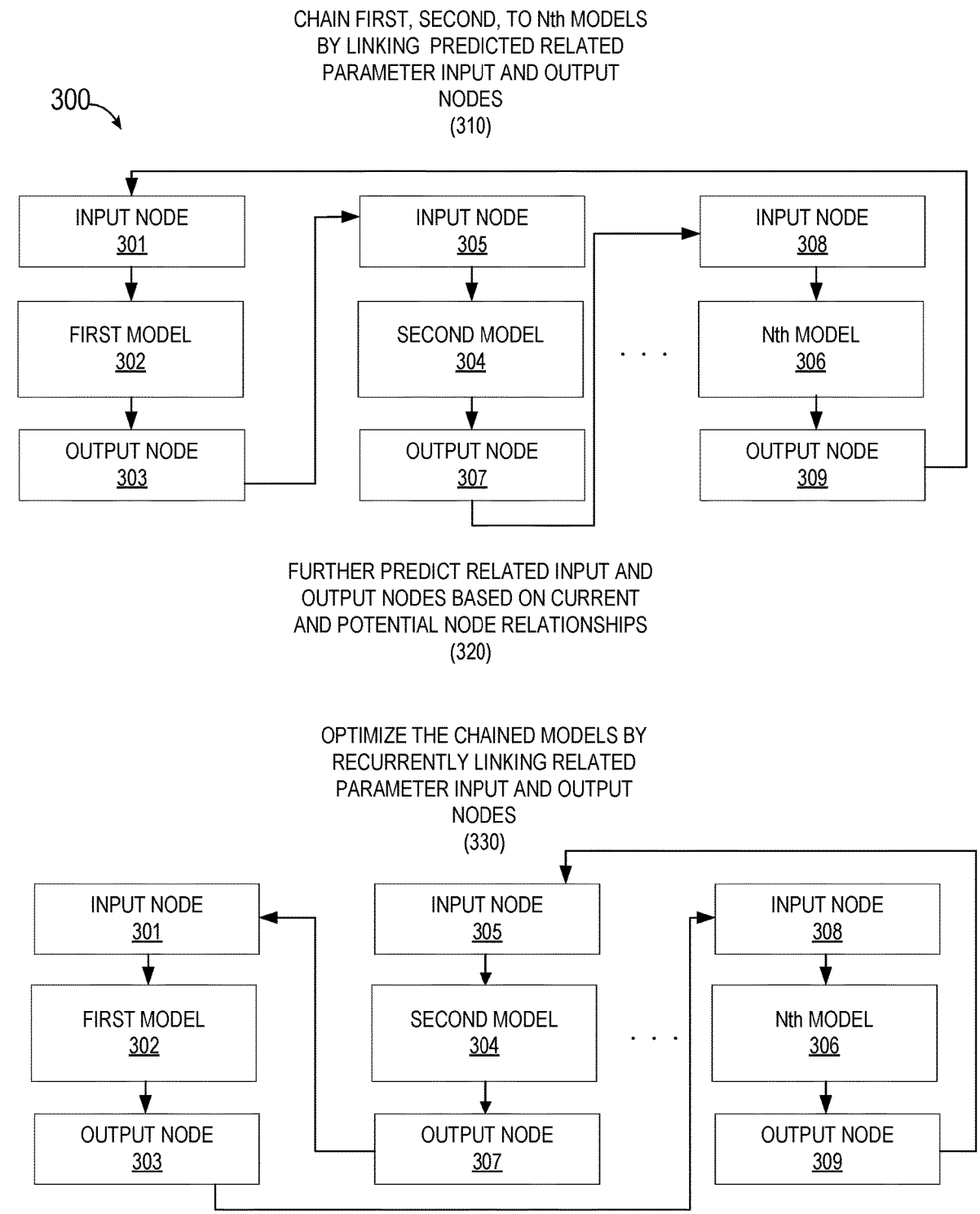
FIG. 3 is another state diagram illustrating the states for chaining a plurality of models together.
Figure 4:
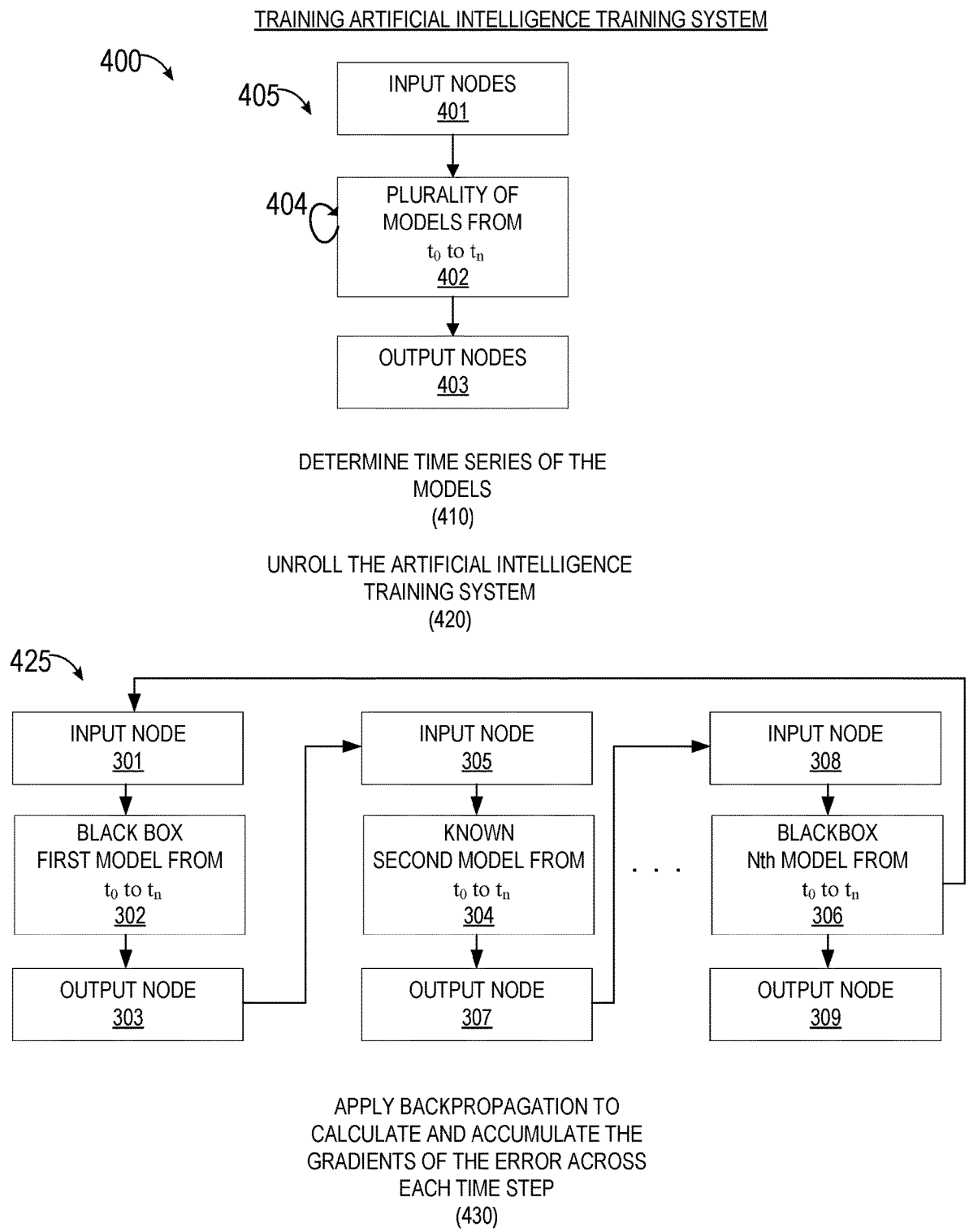
FIG. 4 is another state diagram illustrating the states for training an artificial intelligence training system.

The remaining operations are directed to the parameter input and output node relationships and the chaining of the plurality of models, which are further discussed in FIGS. 3 and 4. For example, the artificial intelligence training system 141 can train an artificial intelligence system using the parameter input and output nodes of the plurality of models, where the artificial intelligence system may be a neural network like an RNN. At (19), the artificial intelligence training system 141 may predict nodal relationships between parameter output and input nodes based on the classifications made by the artificial intelligence training system 141.

The artificial intelligence training system 141 can then transmit the predicted nodal relationship data to the model connector 143 at (20).

At (21), the model connector 143 chains the first and second models by linking and/or re-linking the predicted output and input node relationships. The model connector 143 then transmits the current node relationship data to the artificial intelligence training system 141 at (22) to further predict new node relationships based on the current relationships.

The artificial intelligence training system 141 and/or the model connector 143 may recurrently repeat operations (18) through (22) for individual time instants during a period of time, such as for individual time instants in a time-series. New parameter output and input nodes may be transmitted by the artificial intelligence training system 141 and/or model connector 143 with additional generation of new models during each repetition of operations (18) through (22) and/or with additional generation of new subsystems and/or new objects of the existing models during each repetition of operations (18) through (22).

FIG. 3 is another state diagram 300 illustrating the states for chaining a plurality of models together. Embodiments of this state diagram example 300 are not limited to determining relationships and linking only one parameter input node and one parameter output node per model. For example, this example may be used to determine relationships and link a plurality of parameter input nodes and parameter output nodes per model. Only one parameter input node and one parameter output node per model is shown in example state diagram 200 for exemplary purposes and ease of understanding, but is not meant to be limiting.

At operation (310), the first model, second model, to an Nth model may be chained by the model connector 143 initially linking parameter output and input nodes based on the classifications and predicted relationships made by the artificial intelligence training system 141. In some embodiments, the model connector 143 and/or the artificial intelligence training system 141 may determine the initial linking between parameter output and input nodes by an ontology that may classify parameter output and input nodes. In further embodiments, the model connector 143 and/or artificial intelligence training system 141 may also use an ontological layer with a predefined mapping to further determine initial output and input node relationships.

Referring back to the initial linking of operation (310) of the state diagram 300, the first model 302 may have a parameter input node 301 and a parameter output node 303. The parameter output node 303 of the first model 302 may initially link to the parameter input node 305 of the second model 304 based on a nodal relationship that may be determined by the artificial intelligence training system 141 and/or the ontological layer. The parameter output node 307 of the second model 304 may initially link to the parameter input node 308 of the Nth model 306 based on a nodal relationship that may be determined by the artificial intelligence training system 141 and/or the ontological layer. The parameter output node 309 of the Nth model 306 may initially link to the parameter input node 301 of the first model 302 based on a nodal relationship that may be determined by the artificial intelligence training system 141 and/or the ontological layer.

Moving to operation (320), after the initial linking of the nodes, the artificial intelligence training system 141 may use the current parameter output and input nodes and/or nodal relationships to additionally train the artificial intelligence system to further predict new potential nodal relationships.

In some embodiments, new parameter output and input nodes of the existing models (e.g., first model, second model to Nth model) may be simulated by the model simulator 145 during operation (320) if new subsystems and/or objects are generated by the subsystem simulator 147 and/or object simulator 149. Thus, the artificial intelligence training system 141 can additionally train the artificial intelligence system to further predict new potential nodal relationships. For example, a new virtual water flow rate sensor may be generated by the object simulator 149 after the initial linking has occurred. Thus, there may be a new parameter output or input node for the existing water treatment model that may then be used by the artificial intelligence training system 141 to further predict new potential nodal relationships.

In some embodiments, new parameter output and input nodes may be simulated by the model simulator 145 during operation (320) if new models are generated and/or simulated from the obtained plurality of models. The new parameter output and input nodes may further include new subsystems and/or objects generated by the subsystem simulator 147 and/or object simulator 149. Thus, the artificial intelligence training system 141 can additionally train the artificial intelligence system to further predict new potential nodal relationships. For example, a new wastewater facility model may be simulated that may include a new virtual treatment comminutor sensor, where the new virtual treatment comminutor sensor may be generated by the object simulator 149 after the initial linking has occurred. Thus, there may be a new parameter output or input node for the new wastewater facility model that may then be used by the artificial intelligence training system 141 to further predict new potential nodal relationships.

At operation (330), the model connector 143 may re-link the initially chained models by recurrently linking related parameter input and output nodes based on the current node relationships and predicted new potential nodal relationships of operation (320). This may be further illustrated in the example state diagram 300, where the model connector 143 may re-link the parameter output node 303 of the first model 302 to the parameter input node 308 of the Nth model 306 based on the predicted new nodal relationships and/or observed current nodal relationships that may be determined by the artificial intelligence training system 141 and/or the ontological layer. The model connector 143 may re-link the parameter output node 307 of the second model 304 to the parameter input node 301 of the first model 302 based on the predicted new nodal relationships and/or observed current nodal relationships that may be determined by the artificial intelligence training system 141 and/or the ontological layer. The model connector 143 may re-link the parameter output node 309 of the Nth model 306 to the parameter input node 305 of the second model 304 based on the predicted new nodal relationship and/or observed current nodal relationship that may be determined by the artificial intelligence training system 141 and/or the ontological layer. The use of the artificial intelligence training system 141 in FIG. 3, as well as model type chaining (e.g., whether the models are black box or known), may be further detailed in FIG. 4.

FIG. 4 is another state diagram illustrating the states for training the artificial intelligence training system 141 (e.g., a neural network, such as an RNN 405). In order to optimally chain the models together, each models parameter input nodes and parameter output nodes may be classified by the artificial intelligence training system 141. For example, a RNN 405 may be used to accurately classify each node, which may use artificial intelligence algorithms such as backpropagation of error and gradient descent. Based on the classifications, predicted relationships between parameter input nodes and output nodes may be formed, which may be used to chain the models.

In an embodiment, a plurality of black box and/or known models may be optimally chained together through use of a backpropagation through time (BPTT) algorithm and a RNN 405. A RNN 405 (e.g., a neural network with one or more loops 404) may include the plurality of black box and/or known models 402 in which each model may further include parameter output nodes 403 and parameter input nodes 401. The BPTT may be applied by the artificial intelligence training system 141 to train the RNN 405. The training operations performed by the artificial intelligence training system 141 may include:

Operation (410): Determining the time steps (e.g., total time series from $t_0$ to $t_n$, where $t_0$ is first time step of the time series) of the black box and/or known models with parameter input node and parameter output node pairs (e.g., links) in the RNN 405. Operation (420): Unrolling the RNN 425 (e.g., unroll the one or more loops of the RNN 425) such that the RNN 425 may become a linear series chain (e.g., time series sequence) of black box (e.g., blocks 302 and 306), and/or known models (e.g., block 304), with parameter output node and parameter input node pairs (e.g., blocks 303 and 305, blocks 307 and 308, and blocks 309 and 301) that iterate out for N time step iterations (e.g., optimizing the converging series of the chain).

Operation (430): Applying backpropagation based on automatic differentiation (e.g., chain rule of differentiation) to calculate and accumulate the gradients of the error across each time step for the linear series chain.

The gradient at each time step for the RNN 405 or 425 may depend on the calculation of the current and previous time steps of each model. Further in the RNN 405 or 425, the parameter nodes may be shared by all time steps in the RNN 405 or 425. By unrolling the RNN 425 for each time step, the dependencies between the black box and/or known models objects and object parameters may be obtained. These dependencies may be further classified by the artificial intelligence training system 141 during the backpropagation training operation 430 so that the models may be re-chained based on the most similar classifiers (e.g., re-linking nodes based on which classified parameter input nodes and parameter output nodes are most similar (e.g., re-linking depicted in operation (330) of FIG. 3)). The model chaining may be optimized when the gradient converges so that as optimization occurs, the gradient is converging towards the optima.

Embodiments of this state diagram example 400 are not limited to determining relationships and linking only one parameter input node and one parameter output node per model. For example, this example may be used to determine relationships and link a plurality of parameter input nodes and parameter output nodes per model for a time series of t to $t_n$. Only one parameter input node and one parameter output node per model for a time series of $t_0$ to $t_n$ is shown in example state diagram 400 for exemplary purposes and ease of understanding, but this is not meant to be limiting.

Exemplary User Interfaces

Advantageously, the present disclosure allows users to interact and analyze electronic data (e.g., chained discrete models) in a more analytically useful way. Graphical user interfaces (GUIs) allow the user to visualize otherwise obscure relationships and patterns between different data objects, subsystems, and models. Further these data models may be constructed by different teams or organizations, use different objects and object properties, and contain known and/or black box components. Therefore, though a user may have multiple data models to work with and analyze; visualizing and chaining the data models together to construct the desired real world system can be difficult. Without using the present disclosure, observation and use of such relationships (e.g., chained discrete models) would be virtually impossible given the size and diversity of the many black box and/or known models (e.g., simulation engines, subsystems, and data objects).

The parameter input and output nodes of the models may represent different information like subsystems and/or objects, for example. The lines in the schematic view may represent relationships between the nodes. The ontology may be created or updated in various ways, including those described herein, comprising both manual and automatic processes. In some implementations, the ontology, models, subsystems, and/or objects may be created and/or interacted with visually through various graphical user interfaces. Advantageously, this allows the user to interact with the objects by placing, dragging, linking, and deleting visual entities on a graphical user interface. The ontology may be converted to a low-level (e.g., node list) representation. The object properties, objects, subsystems, models, and links (e.g., relationships) can be visualized using the GUI. The control actions initiated by a user on the graphical user interfaces may be executed in the real world system by using, e.g. actuators.

For illustrative purposes, FIGS. 5-8 depict user interfaces corresponding to physical systems. This is not meant to be limiting, however. For example, the content and/or features of the user interfaces described herein may be provided and/or depicted in user interfaces corresponding to logical systems as well.

Figure 5:
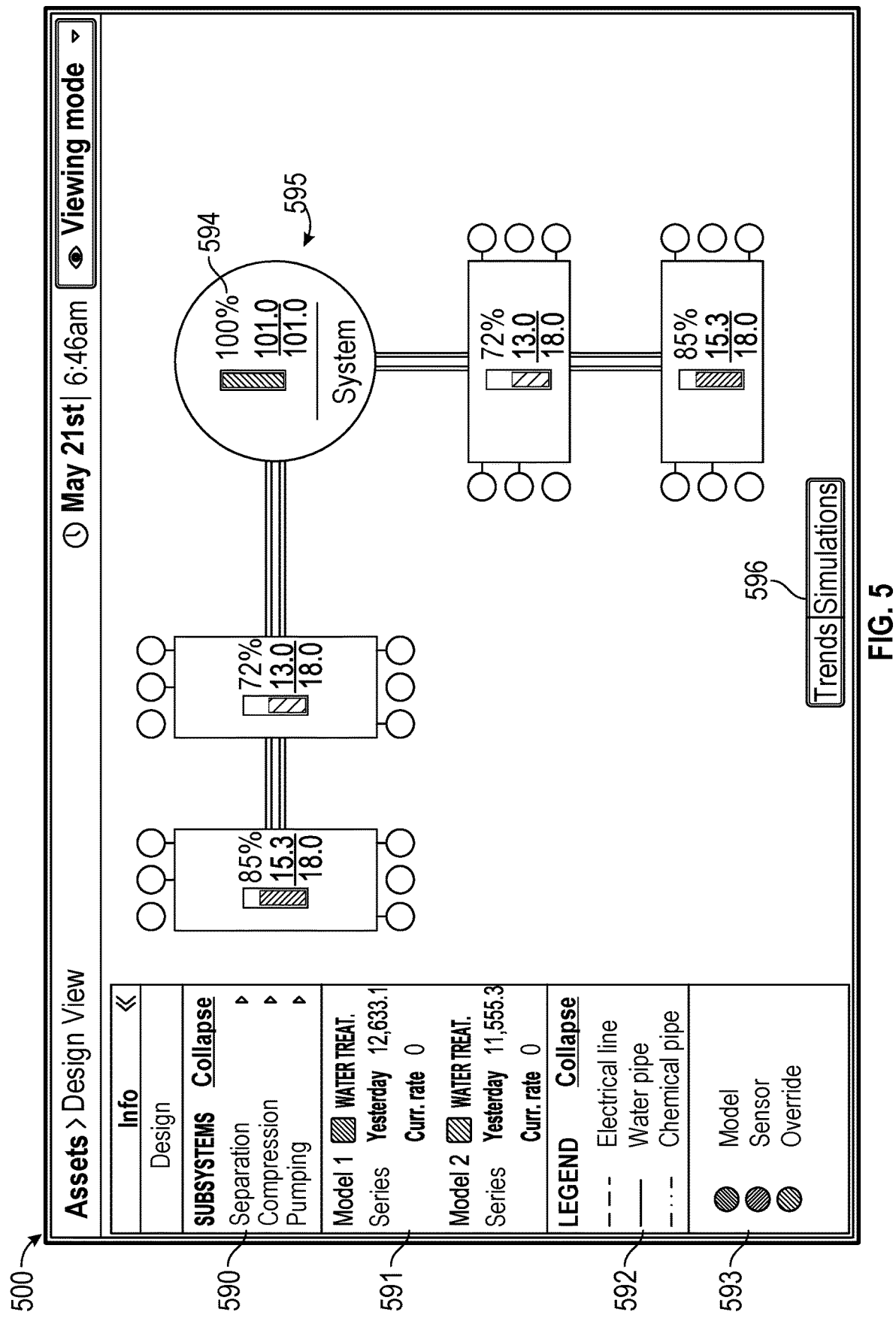
FIG. 5 illustrates a user interface that displays a system representing a real world system.

FIG. 5 illustrates a user interface 500 that displays a view of a system 595 representing a technical real world system. In some embodiments, the system 595 is shown from a high level design view perspective to show at a glance what the high level system design looks like and how the system 595 is performing (e.g., the health of each model 594 per system 595 component). The health of each model 594 per system 595 component may be indicated by the health of each object, object property, and/or subsystem of each model, as illustrated in the low level system view of FIGS. 6-8. A model hierarchy may be generated by the system simulation server 140 based on the health of each model, where related models may be grouped and ordered based on their health. Such grouping is not limited by the number of groups. The system 595 may comprise a plurality of models 591, subsystems 590, and objects with object properties. A low level view of the internal structure of the system that displays the plurality of models 591, subsystems 590, and objects with object properties may be illustrated in FIGS. 6-8. An information panel comprising which subsystems 590 (e.g., separation, compression and pumping), models 591 (e.g., water treatment), links/connectors 592 (e.g., electrical line, water pipe, and chemical pipe) to various objects and/or subsystems, and system indicators 593 (e.g., model, sensor, and override) are being used within the system 595 is displayed in the high level design view of FIG. 5 and low level system view of FIGS. 6-8.

Figure 6:
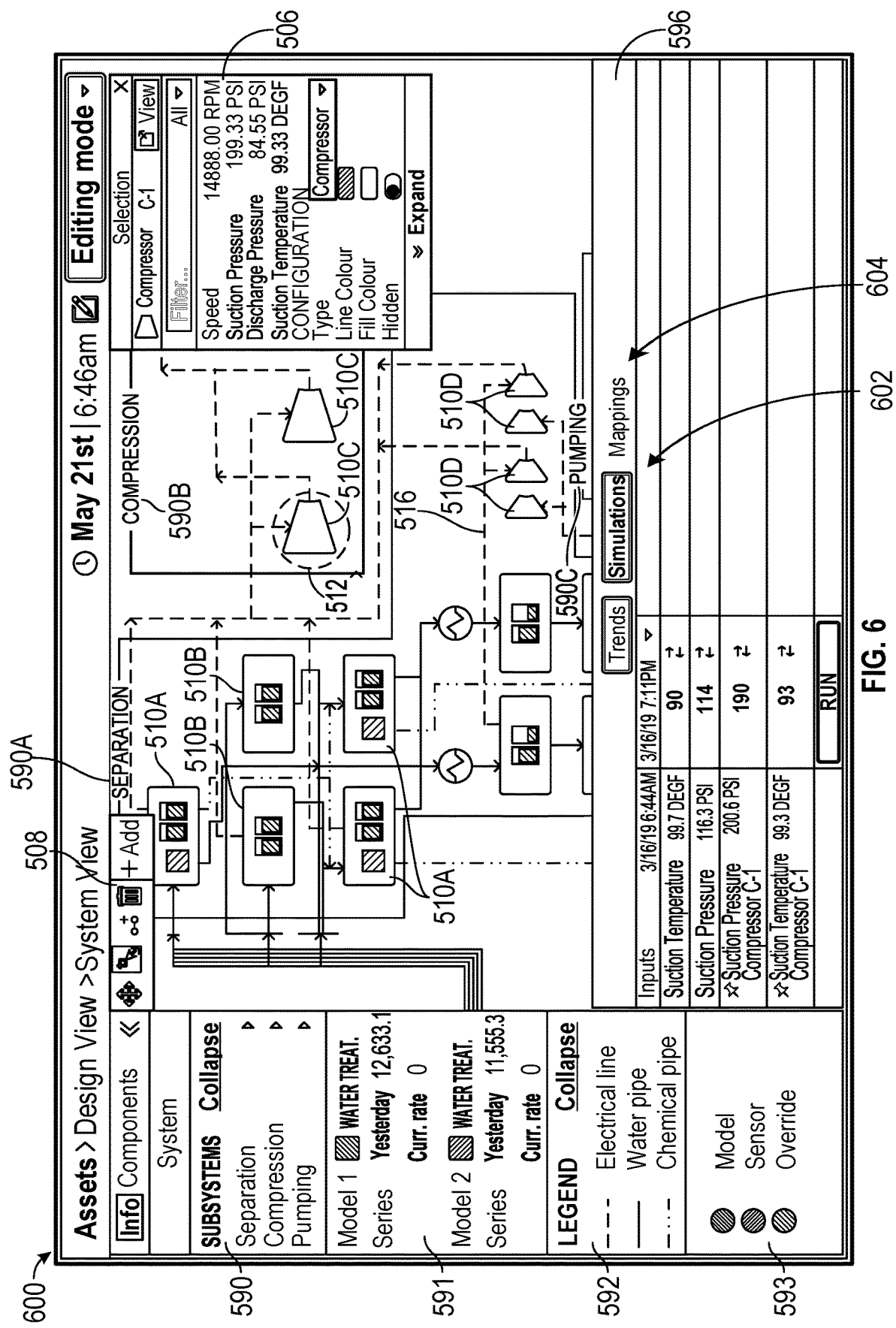
FIG. 6 illustrates another user interface that displays the internal structure of the system with a simulation panel in editing mode.

FIG. 6 illustrates another user interface 600 that displays a view of the internal structure of the system with a simulation panel 602 in editing mode. In some embodiments, the internal structure of the system 595 from FIG. 5 is illustrated from a low level system view perspective to show, via a schematic view, the internal components and relationships thereof that form the system. For example, the subsystems 590 from the information panel are depicted in the schematic view as separation subsystem section 590A, compression subsystem section 590B, and pumping subsystem section 590C. Each subsystem section of the user interface 600 includes objects with object properties. For example, compression subsystem section 590B includes two compressors 510C. Each subsystem and object may have a parameter input and/or output node that may link such that a subsystem parameter output node links to a subsystem parameter input node and/or an object parameter output node links to an object parameter input node. For example, there are five output nodes from the separation subsystem 590A that link to the one input node of the compression subsystem 590B via electrical line 516 of the second water treatment model. Further within each subsystem example, the output nodes from two separators 510D, one separation chamber 510B, and two pump separators 510A (e.g., the five outputs from the separation subsystem 590A) link into the input nodes of two compressors 510C (e.g., the one input node into the compression subsystem 590B is split into two input nodes connected to each compressor 510C within the subsystem). As shown in the example, the links between input and output nodes of a subsystem and/or object may be shared, overlap, or be a one to one connection. The complex input and output node connections (e.g., links) may create complex nodal relationships.

As further described herein, these nodal relationships may be mapped and/or predicted by an ontology or by an artificial intelligence training system 141. These nodal relationships may then be re-linked by the artificial intelligence training system 141 to form new optimal nodal relationships between various subsystems and objects such that an ideal system may be viewed. For example, the artificial intelligence training system 141 may use the input and output nodes as training examples to further predict optimal nodal relationships and re-link the model specific objects and subsystems within the schematic view thus chaining the discrete models.

Relationships between data objects, subsystems and/or models may be stored as links, or in some embodiments, as properties, where a relationship may be detected between the properties. In some cases, as illustrated in FIG. 6, the links may be directional. For example, a water pipe link may have a direction associated with the water flow, where one pump object is a distributor of water, and a water tank object is the receiver of water.

In some embodiments, a user of the system uses an object and property type editor 506 to create and/or modify the object and/or property types (e.g., modify selected 512 compressor 510C configuration) and define attributes of the object types and/or property types (e.g., set the speed, suction pressure, type of compressor etc. for selected 512 compressor 510C). In an embodiment, a user of the system uses a schematic editor 508 to add, delete, move, or edit links, model specific objects, and/or subsystems within the schematic view. Alternatively, other programs, processes, or programmatic controls (e.g., artificial intelligence training system, model connector, model simulator, subsystem simulator and object simulator) may be used to modify, define, add, delete, move, or edit property types, attributes, links, model specific objects and/or subsystems (e.g., using editors may not be required).

Figure 7:
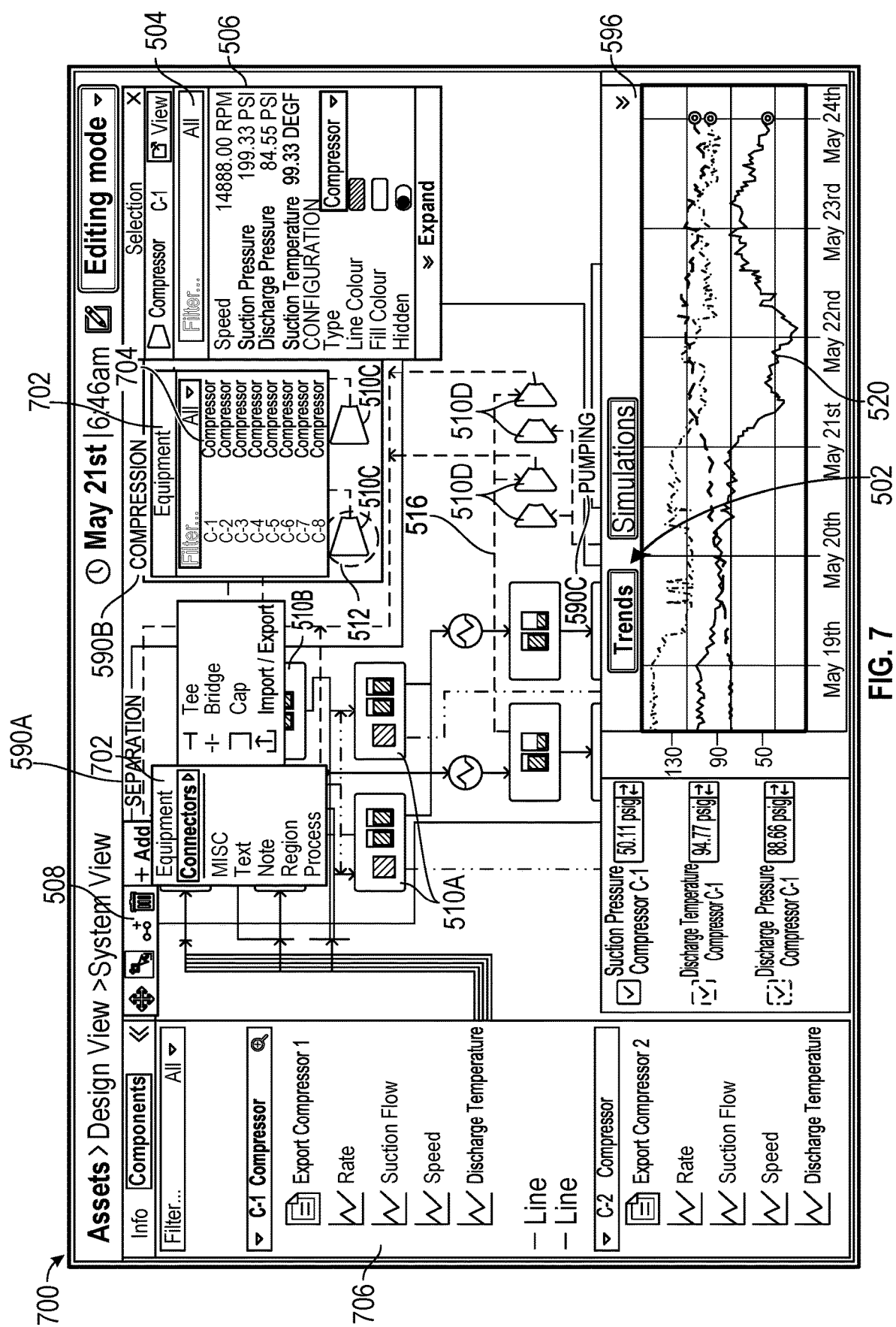
FIG. 7 illustrates another user interface that displays the internal structure of the system with an equipment panel in editing mode.

In some embodiments, a user of the system may use a time-series visualization panel 596 that may include a trends panel 502, as illustrated in FIG. 7, a simulations panel 602, and a mappings panel.

In some embodiments, the simulations panel may allow the user to simulate technical objects, subsystems, and/or models (e.g., via object simulator 149, subsystem simulator 147, and model simulator 145) within the system for a specific time series or at a specific point in time and visualize properties and or attributes associated with each. For example, a compressor object 510C may be selected 512 and the simulations panel 602 may be selected. The starting suction pressure of the compressor object 510C may be 200.6 PSI at 6:44 AM on Mar. 16, 2019, for the simulation. The current suction pressure of the compressor object 510C may be 199.33 PSI at 6:46 AM on May 21, 2019. The simulated suction pressure of the compressor object 510C may be determined to be 190 PSI at 7:11 PM on Mar. 16, 2019, for the simulation. As further described herein, error detection data may be used which may include time specific data. The error detection data may be used to further predict and simulate technical objects, subsystems, and/or models within the system for a specific time series or at a specific point in time and visualize technical properties and or technical attributes associated with each.

In some embodiments, the mappings panel 604 may display a list and/or digraph of predicted and current nodal relationships (e.g., current and predicted parameter input and output node relationships that may have been determined by an ontological layer and/or artificial intelligence training system 141 are displayed in a list and/or digraph).

FIG. 7 illustrates another user interface 700 that further displays the internal structure of the system with an equipment panel 702 in editing mode. In addition to visually showing relationships between the data objects, the user interface 700 may allow various other manipulations. For example, the objects may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations as seen via elements 504 of the selection panel and 704 of the equipment panel.

In some embodiments, the trends panel 502 may display a graph of historical and predicted time series data 520 (e.g., simulated technical objects, subsystems and/or models) within the system for a time series and visualize technical properties and or attributes associated with each via lines on a line graph. In some embodiments, the time series data 520 may additionally be displayed in the information panel 706. As further described herein, error detection data may be used which may include time specific data. The error detection data may be used to further predict and simulate technical objects, subsystems and/or models within the system for a specific time series or at a specific point in time and visualize properties and or attributes associated with each.

Figure 8:
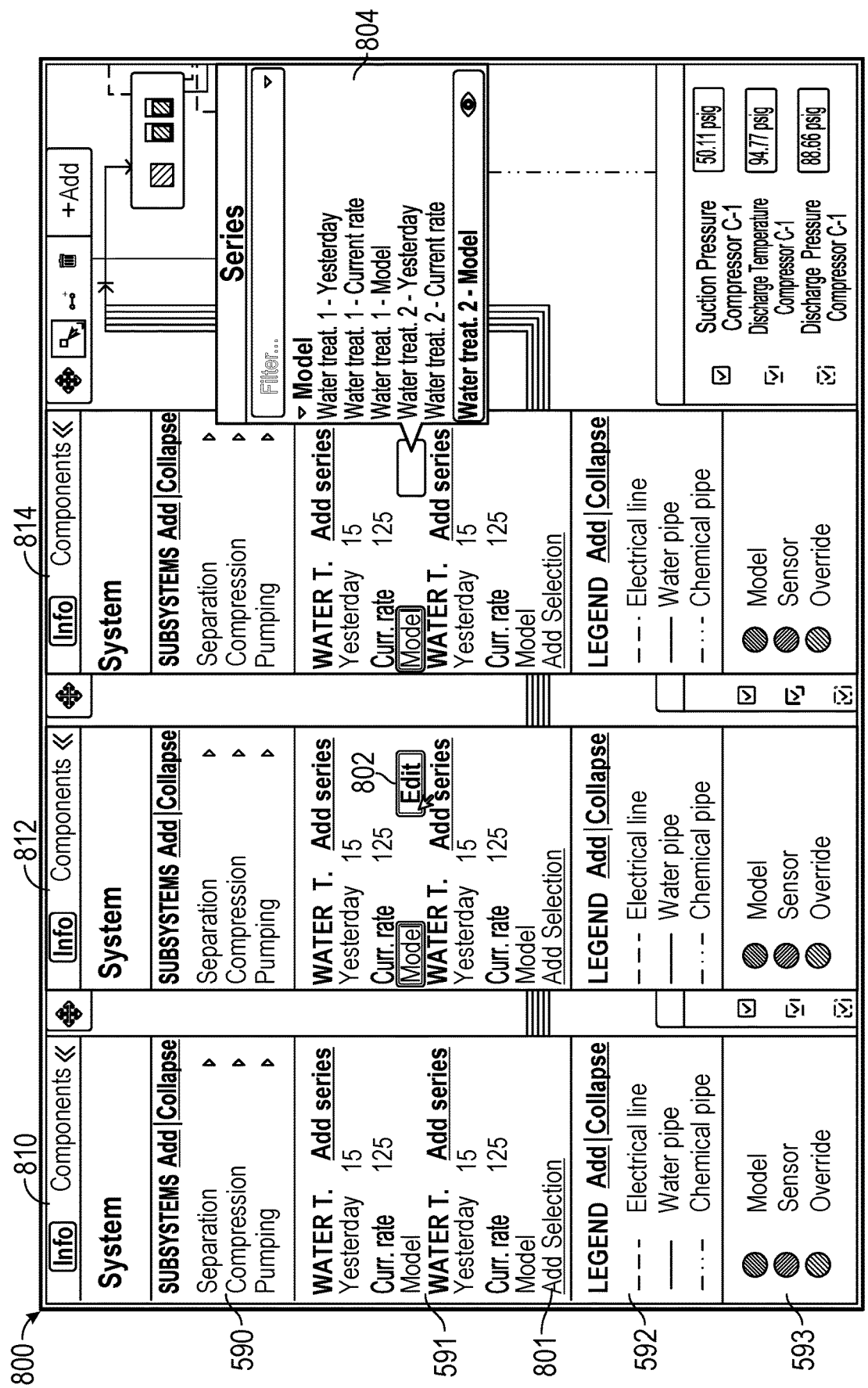
FIG. 8 illustrates a series of the same user interface which displays an information panel being edited in editing mode of the internal structure of the system.

FIG. 8 illustrates a series 810, 812, and 814 of the same user interface 800 that displays an information panel being edited in editing mode of the internal structure of the system. In some embodiments, current models may be swapped out (e.g., via edit button 802) for other models 804 (e.g., new models, same models but from a different time series, same models but with different rates, same models but with a different health, etc.). In some embodiments, new and/or the same models may be added via button 801 (e.g., new models, same models but from a different time series, same models but with different rates, same models but with a different health, etc.). In this way a user may plug in specific models of their choosing to be chained within the system.

Exemplary Process for Determining Model Relationships

Figure 9:
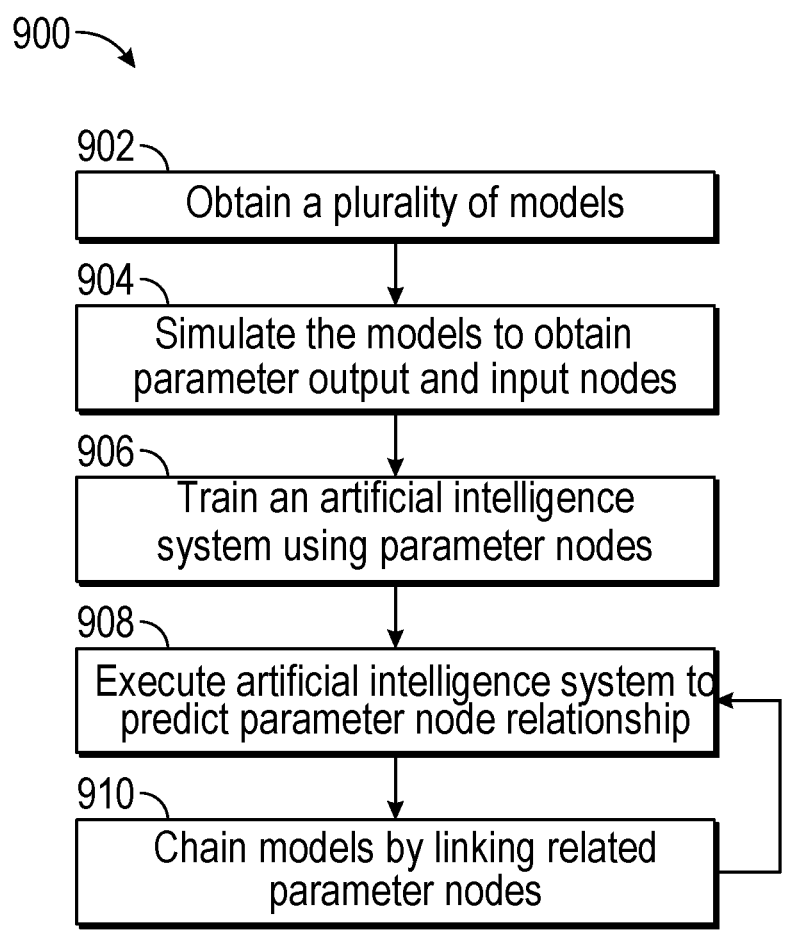
FIG. 9 is a flowchart illustrating a process for determining relationships between one or more outputs of a first model and one or more inputs of a second model that collectively represent a real world system, and chaining the models together.

FIG. 9 is a flowchart illustrating a process 900 for determining relationships between one or more parameter outputs nodes of a first model and one or more parameter inputs nodes of a second model that collectively represent a real world system, and chaining the models together. The process 900 may be implemented by the system simulation server 140 (e.g., the artificial intelligence training system 141, the model connector 143, the model simulator 145, the subsystem simulator 147, and/or the object simulator 149) of FIG. 1.

At block 902, a plurality of models is obtained. The models may be obtained by the model simulator 145 illustrated in FIG. 1.

At block 904, the models may be simulated to obtain parameter output and input nodes. The parameter output and input nodes may include simulated model data comprised of model specific technical subsystems, objects, and/or object properties (e.g., property types and/or property values). The models may be simulated by the model simulator 145 illustrated in FIG. 1.

At block 906, an artificial intelligence system (e.g., artificial intelligence training system 141 illustrated in FIG. 1) may be trained using the parameter input and output nodes as training examples. For example, the artificial intelligence system can be an RNN.

At block 908, the artificial intelligence system may be executed to predict relationships between the parameter input and output nodes. As described herein, the execution may be repeated multiple times to link and/or re-link parameter output nodes of some models with parameter input nodes of other models.

At block 910, the models may be chained by linking predicted related parameter input and output nodes and may be continuously re-chained by re-linking related parameter input and output nodes based on the predicted parameter node relationships established by each execution of the artificial intelligence system. Additional details regarding the operations performed in blocks 906, 908 and 910 are further detailed in the Exemplary Model Chaining Process Overview section described herein.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
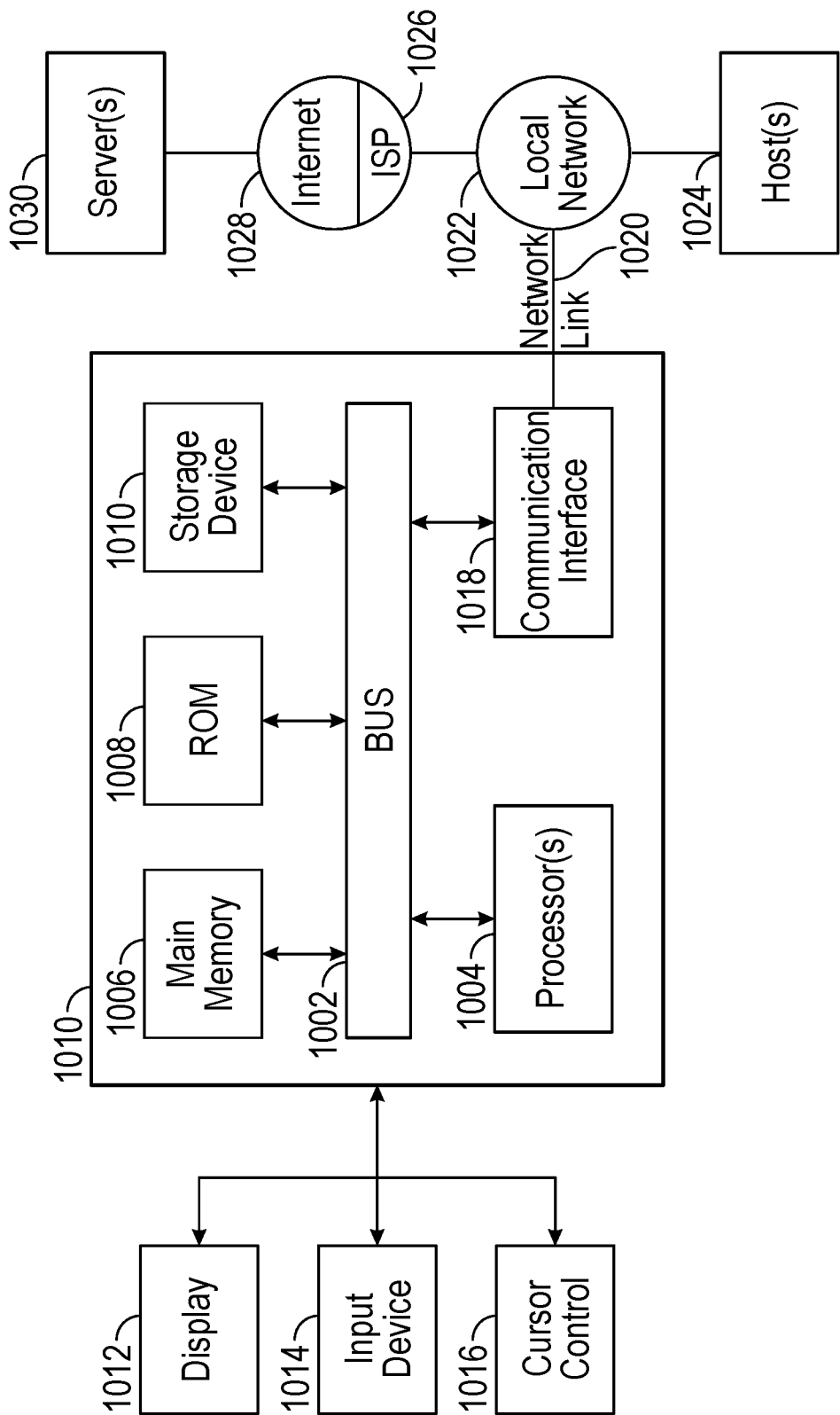
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Another aspect of the disclosure provides a computer-implemented method for model chaining, the method comprising by one or more processors executing program instructions: obtaining a plurality of models, wherein the plurality of models comprises a first model and a second model, and wherein each of the first and second models comprises at least one or more objects having one or more object properties; simulating the first and second models to obtain a parameter output node of the first model and a parameter input node of the second model; training an artificial intelligence model using the parameter output and input nodes, wherein the artificial intelligence model, when executed, predicts that the parameter output node is related to the parameter input node; and chaining the first and second models by linking the parameter output node with the parameter input node.

In some embodiments, the artificial intelligence training system (e.g., artificial intelligence model) may optimize the chained first and second models by recurrently linking related parameter output nodes with related parameter input nodes. The artificial intelligence model may optimize the chained first and second models by iteratively optimizing a converging series of the chained first and second models. The iterative optimization may be performed through techniques such as machine learning. The machine learning techniques may improve the functionality of the computing device itself as the machine learning techniques allow the system to learn, and thereby predict more accurate parameter input node and output node relationships, without being explicitly programmed. The converging series of the chained first and second models may converge towards an optima, wherein a gradient on the series of the chained first and second models converges towards the optima. The artificial intelligence model may comprise of a recurrent neural network (RNN).

In some embodiments, one or more models may be one of a known or black box system. For example, a known model may comprise subsystems, objects and object properties that are known to the user or if the model does not comprise subsystems then all objects and object properties are known to the user, whereas a black box system model may comprise at least one unknown subsystem, object or object property.

In some embodiments, at least one or more technical objects may be one of physical or virtual devices. The technical objects may further be comprised of physical or virtual measuring devices or sensors that are coupled to physical or virtual pumps, machinery, welding stations, vats, containers, compressors, fans, turbines, blowers, air conditioning systems, heating systems, noise and attenuation systems, ventilation systems, hydraulic systems, pneumatic systems, actuators, fasteners, threads, piping systems, valves, beams, columns, cables, nozzles, semiconductor devices, motors, transformers, electrical components, wires, generators, nuclear reactors, or other objects relevant to the pertaining model. The technical objects may further be used for detecting, measuring, positioning, signaling, gauging, or sensing external stimuli. The objects may be user configurable, editable, or removable.

In some embodiments, the one or more technical object properties may be numerical, physical, geometrical, inferred, real, simulated, or virtual. Further the object properties may comprise of logical computations related to order volume, sales amounts, sales quantity during a time period (e.g., a day, a week, a year, etc.), population density, patient volume, or other object properties relevant to the pertaining model. Alternatively or in addition, the object properties may comprise of measurements related to temperature, pressure, flow rate, capacity, time, length, mass, electric current, amount of substance, luminous intensity, plane angle, solid angle, frequency, energy, power, charge, voltage, capacitance, resistance, conductance, flux, inductance, radioactivity, dose, catalytic activity, area, volume, speed, acceleration, density, or other object properties relevant to the pertaining model.

In some embodiments, the artificial intelligence model is a recurrent neural network.

In some embodiments, training an artificial intelligence model further comprises unrolling the recurrent neural network.

In some embodiments, training an artificial intelligence model further comprises applying a backpropagation to the unrolled recurrent neural network to calculate and accumulate one or more gradients.

In some embodiments, the data resulting from the simulation of multiple models may comprise of historical object data, historical object property data, live object data, live object property data, predicted object data and predicted object property data.

In some embodiments, the first and second models are simulated for a time range or a point in time. The time range may comprise of seconds, minutes, hours, days, weeks, or years.

In some embodiments, the chained first and second models may display in a graphical user interface (GUI) that depicts at least one of interconnections between the first and second models, the parameter input node, the parameter output node, the at least one or more objects, or the one or more object properties.

In some embodiments, a first object property of the one or more object properties may be associated with the first model and may have a health value. The health value of the first object property of the model may further indicate a health of the first model. Further, a model hierarchy may be generated based on the health of the first model and a health of the second model. Further a model hierarchy grouping of additional models such as a third model in the plurality of models and a fourth model in the plurality of models that share related parameter nodes of the first model and of the second model may be generated. Such grouping is not limited by the number of groups.

Another aspect of the disclosure provides a system for model chaining comprising: one or more non-transitory computer readable storage mediums having program instructions embodied therewith; and one or more processors configured to execute the program instructions to cause the system to perform: obtainment of a plurality of models, wherein the plurality of models comprises a first model and a second model, and wherein each of the first and second models comprises at least one or more objects having one or more object properties; simulation of the first and second models to obtain a parameter output node of the first model and a parameter input node of the second model; artificial intelligence system training using the parameter output and input nodes, wherein the artificial intelligence system, when executed, predicts that the parameter output node is related to the parameter input node; and first and second model chaining by linking the parameter output node with the parameter input node.

Another aspect of the disclosure provides a computer program product for model chaining comprising: one or more non-transitory computer readable storage mediums having program instructions embodied therewith; and the program instructions executable by one or more processors to cause the one or more processors to perform: obtainment of a plurality of models, wherein the plurality of models comprises a first model and a second model, and wherein each of the first and second models comprises at least one or more technical objects having one or more technical object properties; simulation of the first and second models to obtain a parameter output node of the first model and a parameter input node of the second model; artificial intelligence system training using the parameter output and input nodes, wherein the artificial intelligence system, when executed, predicts that the parameter output node is related to the parameter input node; and first and second model chaining by linking the parameter output node with the parameter input node.

As noted above, implementations of the described examples provided above may include hardware, a method or process, and/or computer software on a computer-accessible medium.

Aspects of the present disclosure are described herein with reference to Application Programming Interfaces (APIs). Various third-parties operate electronic services systems which in some instances, these systems may allow access through APIs. Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for model chaining, the method comprising:
obtaining a plurality of models, wherein the plurality of models comprises a first model and a second model, wherein the first model comprises at least one or more first objects, and wherein the second model comprises at least one or more second objects that are different than the at least one or more first objects;
simulating one or more first objects of the first model using first error detection data that indicates one or more errors that occurred in historical operation of the first model and one or more second objects of the second model using second error detection data that indicates one or more errors that occurred in historical operation of the second model to obtain a parameter output node of the first model and a parameter input node of the second model;
training an artificial intelligence model using the parameter output node of the first model and the parameter input node of the second model, wherein the trained artificial intelligence model, when executed, generates a prediction that the parameter output node of the first model is related to the parameter input node of the second model; and
based at least in part on the generated prediction of the trained artificial intelligence model and an ontological layer, chaining the first and second models by linking the parameter output node of the first model with the parameter input node of the second model, wherein the ontological layer comprises a mapping of a nodal relationship between parameter output and input nodes,
wherein the method is performed using one or more processors.

2. The computer-implemented method of claim 1, further comprising optimizing the chained first and second models by recurrently linking related parameter output nodes with related parameter input nodes.

3. The computer-implemented method of claim 1, further comprising optimizing the chained first and second models by iteratively optimizing a converging series of the chained first and second models.

4. The computer-implemented method of claim 3, wherein the converging series of the chained first and second models converges towards an optima, wherein a gradient on the series of the chained first and second models converges towards the optima.

5. The computer-implemented method of claim 1, wherein the artificial intelligence model is a recurrent neural network.

6. The computer-implemented method of claim 5, wherein training an artificial intelligence model further comprises unrolling the recurrent neural network.

7. The computer-implemented method of claim 6, wherein training an artificial intelligence model further comprises applying a backpropagation to the unrolled recurrent neural network to calculate and accumulate one or more gradients.

8. The computer-implemented method of claim 1, wherein the first model is one of a known or black box system.

9. The computer-implemented method of claim 1, wherein the at least one or more first objects are one of physical or virtual devices.

10. The computer-implemented method of claim 9, wherein the at least one or more first objects at least one of detect, measure, position, signal, gauge, or sense external stimuli.

11. The computer-implemented method of claim 10, wherein the at least one or more first objects are at least one of user configurable, editable, or removable.

12. The computer-implemented method of claim 1, wherein the first and second models are simulated for a time range or a point in time.

13. The computer-implemented method of claim 1, further comprising causing display of the chained first and second models in a graphical user interface that depicts at least one of interconnections between the first and second models, the parameter input node, the parameter output node, or the at least one or more first objects.

14. The computer-implemented method of claim 1, wherein the first model is associated with a health value that indicates a health of the first model.

15. The computer-implemented method of claim 14, further comprising generating a model hierarchy based on the health of the first model and a health of the second model.

16. The computer-implemented method of claim 15, further comprising grouping a third model in the plurality of models and a fourth model in the plurality of models that share related parameter nodes.

17. A system for model chaining comprising:
one or more non-transitory computer readable storage mediums storing program instructions; and
one or more processors configured to execute the program instructions, wherein the program instructions, when executed, cause the system to:
obtain a plurality of models, wherein the plurality of models comprises a first model and a second model, wherein the first model comprises at least one or more first objects, and wherein the second model comprises at least one or more second objects that are different than the at least one or more first objects;
simulate one or more first objects of the first model using first error detection data that indicates one or more errors that occurred in historical operation of the first model and one or more second objects of the second model using second error detection data that indicates one or more errors that occurred in historical operation of the second model to obtain a parameter output node of the first model and a parameter input node of the second model;
train an artificial intelligence model using the parameter output node of the first model and the parameter input node of the second model, wherein the trained artificial intelligence model, when executed, generates a prediction that the parameter output node of the first model is related to the parameter input node of the second model; and
based at least in part on the generated prediction of the trained artificial intelligence model and an ontological layer, chain the first and second models by linking the parameter output node of the first model with the parameter input node of the second model, wherein the ontological layer comprises a mapping of a nodal relationship between parameter output and input nodes.

18. The computer-implemented method of claim 2, wherein recurrently linking related parameter output nodes with related parameter input nodes comprises:
training the artificial intelligence model using current nodal relationships to predict new nodal relationships between parameter output nodes and parameter input nodes; and
chaining related parameter input nodes and parameter output nodes by re-linking the parameter output nodes with the parameter input nodes based on the current nodal relationships and predicted new nodal relationships.

* * * * *